Patented May 16, 1939

2,158,111

UNITED STATES PATENT OFFICE 2,158,111

VINYL RESIN FINISHING SYSTEM

Arthur K. Doolittle, South Charleston, W. Va., assignor to Carbide and Carbon Chemicals Corporation, a corporation of New York No Drawing. Application June 4, 1937,
Serial No. 146,438

4 Claims. (Cl. 91—70)

The invention relates to an improved finishing system, including a method of producing ornamental and protective vinyl resin surface coatings of improved adherence and stability characteristics. It is particularly concerned with a composite finish for metal surfaces of iron, tin-plate and zinc, in which the priming and finishing coats are composed of types of vinyl resins differing in their solubilities and other properties.

As a finishing or final coating film for the purpose of this invention, those vinyl resins are preferred which may be of the type formed by the conjoint polymerization of vinyl halides, such as vinyl chloride, with vinyl esters of the lower aliphatic acids, such as vinyl acetate, propionate, butyrate, and formate. These resins because of their physical and chemical resistance have been found to be excellently suited for surface coating purposes, and the conjointly polymerized products of vinyl chloride and vinyl acetate, containing in the conjoint polymer about 80% to 90% of vinyl chloride, have proven especially valuable in lacquer compositions.

It has also been found, however, that suitable adhesion of lacquers containing these vinyl resins to metals and other smooth surfaces can only be obtained with certain difficulties, and that baking at relatively high temperatures is quite essential to obtain proper film adherence. In the presence of, and in contact with, metals such as iron, tin-plate and zinc, the conjoint vinyl resin polymer has a decided tendency to deteriorate when heated to elevated temperatures, and these metals appear to promote or catalyze a decomposition in a coating film of normal thickness on baking. This decomposition has been substantially retarded by incorporating with the resin certain stabilizing materials, and numerous compounds have heretofore been proposed for this purpose. A more ready and simple manner of preventing the resin deterioration in the presence of those metals exerting a catalytic decomposition effect would, however, be valuable, and it is with this problem that the present invention is directly concerned.

It is the principal object of the invention to provide an improved vinyl resin finish which may be baked on metal surfaces, particularly those of iron, tin-plate and zinc or alloys of these metals, without danger of thermal decomposition, and with the assurance of a strongly adherent and resistant film coating. It is a further object to provide an improved and simplified method of finishing such surfaces with lacquers of vinyl resins.

In accordance with my invention, I employ a composite coating system, that is one comprising two or more film coatings, in which the priming coat, or the film in direct contact with the metal surface, comprises a vinyl resin differing in solubility and other inherent characteristics from the conjoint vinyl polymer which forms the finish coat. The priming coat is composed of a type of vinyl resin which is not susceptible to thermal decomposition at the baking temperatures necessary to obtain good adhesion, and it is one which is not affected catalytically by the metals in contact therewith. Another essential property of the type of resin suitable for the priming coat is its lack of solubility in ketone and ester solvents, hydrocarbon diluents, and other components of the thinner formulas commonly used with conjointly polymerized vinyl resins. Thus a finish coat of the latter resin may be applied without softening and dissolving the primary film. After applying the priming coat it can be baked prior to the application of the finishing film, or both films of the composite coating can be baked together. By either expedient the conjoint vinyl polymer is not in direct contact with the metal surface, and when applied in this manner over iron, tin-plate, zinc or their alloys, in films of the usual surface coating thickness, the resin finish will remain clear and free of discoloration after prolonged baking at temperatures of 350° F. or higher.

As the vinyl resin for the priming coat composition those are preferred which may be termed more specifically polyvinyl partial acetal resins. These resins comprise polymeric vinyl bodies in which definite proportions of the functional groups are combined in acetal-type linkage with certain aldehydes, while practically all of the remainder exist as free hydroxyl groups. They may be formed by incomplete reaction of the aldehydes with polyvinyl alcohol, the reaction occurring simultaneously with or subsequently to the formation of the polyvinyl alcohol from polyvinyl esters. Particularly valuable resins of this type include those made from polyvinyl alcohol or esters which have molecular weights of at least 7,000 and preferably in excess of 25,000, the molecular weight being calculated by means of Staudinger's formula from viscosity determinations on solutions of the materials. The aldehyde reactant is also preferably limited to an aliphatic saturated unbranched-chain compound having from two to six carbon atoms in the molecule, and the degree of acetalization most desirable is within the range of 33% to 94%. Specifically, polyvinyl partial acetal resins made in this manner from acetaldehyde, butyraldehyde, propionaldehyde, and valeraldehyde, with the degree of acetalization varying inversely as the number of carbon atoms in the aldehyde used, are especially suitable for the purpose of this invention. The actual preparation of the resins may follow methods heretofore disclosed.

These polyvinyl acetal resins are inherently resistant to deterioration at elevated temperature and when applied in lacquer form to metal surfaces can be baked without decomposition to form strongly adherent films. In contact with metals such as iron, tin-plate and zinc no catalytic decomposition effect is evident. The resins of this type are in general soluble in alcohols and alcohol-water mixtures, but they have little or no solubility in the ketone and ester solvents, and hydrocarbon diluents, commonly employed in lacquer thinners for resins of the conjointly polymerized vinyl chloride and vinyl acetate type. Application of a finishing coat of the latter resin can therefore be made without disturbing the adherence and stability of the priming coat, and, in the composite finish, the most desirable attributes of both resin types are retained, particularly with respect to their application as coatings for surfaces of iron, tin-plate, zinc, and alloys of these metals.

Among many experiments made to prove the advantages of this invention, the following are representative of practical embodiments of the finishing system:

A solution of a polyvinyl partial acetal resin formed by acetalization of polyvinyl alcohol to about 66% with butyraldehyde in the manner previously described, was applied as a coating directly to a surface of tin-plate. About a 10% solution of the resin in isopropanol was used. After drying this film was then covered with a finish coat comprising conjointly polymerized vinyl chloride and vinyl acetate containing about 88% vinyl chloride in the conjoint polymer. The latter resin was applied as a solution thereof in methyl isobutyl ketone. The composite coating was then baked at a temperature of about 350° F. for a period of 30 minutes without noticeable discoloration or decomposition of either the priming or finishing coat. A clear, tough and strongly adherent finish was obtained, which on immersion in boiling water retained its adhesion. By contrast a film of the same conjointly polymerized resin, when applied directly to the metal surface and baked under similar conditions, was badly discolored, and decomposed to an extent destroying its usefulness as a protective coating.

A similar polyvinyl partial acetal resin priming coat was applied to a brass surface. In this instance the priming coat was baked before the finish film was applied, and after baking at a temperature of 350° F. for a period of about 45 minutes no appreciable discoloration occurred. The primer was then covered with the same conjoint vinyl resin polymer as above, and the composite coating subjected to further baking at a temperature of 275° F. for a period of at least a half hour. The resulting finish was clear, tough and adherent, and showed no detrimental discoloration.

In further experiments, a priming coat was employed consisting of a polyvinyl acetal resin formed by more nearly complete acetalization with butyraldehyde. This resin was prepared from a comparatively low molecular weight polyvinyl ester, which together with a higher degree of acetalization, improved spraying characteristics of the resin and its resistance to water absorption. A solution of about 12% of this resin in butanol could be readily applied to surfaces of iron, tin-plate or zinc by brushing or roll-coating, and with further dilution with toluene to about 8% solids was of good spraying viscosity. A film so applied showed good adherence to the coated surface after baking at 300° F. for about 15 minutes. At temperatures as high as 350° F. the primer coat resisted appreciable discoloration for periods of one-half hour or longer. A baked finishing coat of the conjointly polymerized vinyl resin over this priming produced a clear tough composite finish which maintained good adherence when immersed in boiling water for periods as long as 30 minutes. This resistance to boiling water is quite remarkable, as films of the conjoint vinyl resin polymer on these metals, employed without this priming coat, quite commonly fail in less than a minute under such a test.

In the compounding of the separate coating formulas many modifications over those specifically described are possible. As a solvent in the finish coat, a liquid should be used which will not dissolve or appreciably soften the prime coat, but the solubility characteristics of polyvinyl acetal resins are such as to permit a wide range of choice in this respect.

Other types of vinyl resins may also be found suitable for both the priming and finishing coats, which show similar relative characteristics in solubility and resistance to thermal decomposition. Stabilizers are not necessary in either coating of the composite finish as a preventative of heat deterioration, but they can be added if desired. Plasticizing materials, pigments, coloring agent, and other modifying compounds can also be employed without destroying the essential advantages of the system.

The above and other modifications are intended to be included within the scope of the invention, which should not be limited other than as defined in the appended claims.

I claim:

1. A coated article comprising a metallic surface of iron, tin-plate or zinc having a strongly adherent composite film thereon, said film consisting of an outer finishing coat, composed essentially of a vinyl resin resulting from the conjoint polymerization of vinyl chloride with vinyl acetate, which is directly superimposed and in intimate contact with a priming coat, said latter coat being composed essentially of a polyvinyl partial acetal resin acetalized with an aliphatic aldehyde having from two to six carbon atoms and being adapted to provide an adherent protective covering for the metal surface to prevent deleterious contact thereof with said vinyl resin outer coat, both of said coats having been baked at a temperature of above 275° F.

2. A coated article comprising a metallic surface of iron, tin-plate or zinc having a strongly adherent composite film thereon, said film consisting of an outer finishing coat, composed essentially of a vinyl resin resulting from the conjoint polymerization of vinyl chloride with vinyl acetate and having about 80% to 90% vinyl chloride in the conjoint polymer, which is directly superimposed and in intimate contact with a priming coat, said latter coat bing composed essentially of a polyvinyl partial acetal resin acetalized with butyraldehyde and being adapted to provide an adherent protective covering for the metal surface to prevent deleterious contact thereof with said vinyl resin outer coat, both of said coats having been baked at a temperature of above 275° F.

3. Process of producing strongly adherent and resistant coatings on metal surfaces of iron, tinplate and zinc having an outer finish composed of a vinyl resin resulting from the conjoint polymerization of vinyl chloride with vinyl acetate, which comprises forming a composite film by first applying directly to the metal surface a priming coat adapted to completely cover said metal surface and prevent deleterious contact thereof with said vinyl resin finish, said priming coat being composed essentially of a polyvinyl partial acetal resin acetalized with an aliphatic aldehyde having from two to six carbon atoms, subsequently superimposing in intimate contact with said priming coat said vinyl resin finish, and baking both coatings at a temperature of above 275° F.

4. Process of producing strongly adherent and resistant coatings on metal surfaces of iron, tinplate and zinc having an outer finish composed of a vinyl resin resulting from the conjoint polymerization of vinyl chloride with vinyl acetate, which comprises forming a composite film by first applying directly to the metal surface, and baking thereon at a temperature above 275° F., a priming coat adapted to completely cover said metal surface and prevent deleterious contact thereof with said vinyl resin finish, said priming coat being composed essentially of a polyvinyl partial acetal resin acetalized with an aliphatic aldehyde having from two to six carbon atoms, subsequently superimposing in intimate contact with said priming coat said vinyl resin finish, and baking the composite coating at a temperature above 275° F.

ARTHUR K. DOOLITTLE.